(12) United States Patent
Vaislic et al.

(10) Patent No.: US 12,531,149 B2
(45) Date of Patent: Jan. 20, 2026

(54) SYSTEM FOR CONTROLLING A STERILE VOLUME

(71) Applicant: REMED-IA TECHNOLOGIES, Saint-Cannat (FR)

(72) Inventors: Claude Vaislic, Versailles (FR); Olivier Gafsou, Issy-les-Moulineaux (FR)

(73) Assignee: REMED-IA TECHNOLOGIES, Saint-Cannat (FR)

( * ) Notice: Subject to any disclaimer, the term of this patent is extended or adjusted under 35 U.S.C. 154(b) by 770 days.

(21) Appl. No.: 17/795,704

(22) PCT Filed: Jan. 29, 2021

(86) PCT No.: PCT/EP2021/052056
§ 371 (c)(1),
(2) Date: Jul. 27, 2022

(87) PCT Pub. No.: WO2021/152059
PCT Pub. Date: Aug. 5, 2021

(65) Prior Publication Data
US 2023/0053839 A1  Feb. 23, 2023

(30) Foreign Application Priority Data
Jan. 29, 2020 (FR) ..................... 2000886

(51) Int. Cl.
*G08B 21/00* (2006.01)
*A61L 2/24* (2006.01)
*G16H 40/20* (2018.01)

(52) U.S. Cl.
CPC ............... *G16H 40/20* (2018.01); *A61L 2/24* (2013.01); *A61L 2202/14* (2013.01); *A61L 2202/25* (2013.01)

(58) Field of Classification Search
CPC ...... A61B 18/1815; A61B 2018/00017; A61B 2018/00023; A61B 2018/00577;
(Continued)

(56) References Cited

U.S. PATENT DOCUMENTS 5,143,281 A * 9/1992 Mainz .................... B65D 5/061
229/5.5
10,271,766 B1 * 4/2019 Parker, Jr. ............ A61B 5/0833
(Continued)

FOREIGN PATENT DOCUMENTS

| EP | 2477168 | 7/2012 |
|----|---------|--------|
| JP | 2003076415 | 3/2003 |

(Continued)

OTHER PUBLICATIONS

International Search Report & Written Opinion issued in International Application No. PCT/EP2021/052056, dated Jun. 15, 2021.
(Continued)

*Primary Examiner* — Daniel Previl
(74) *Attorney, Agent, or Firm* — Helene Laville; HEFIP, LLC (57) ABSTRACT

The invention relates to a system for controlling (26) the asepsis of a sterile volume (23), the system (26) comprising:—at least one detection sensor (28) which is configured to allow detecting an intrusion (30) in the sterile volume (23) and to output a signal (34a) relating to said detection,—a system for determining (32) an aseptic fault of the sterile volume (23), which is configured to receive the at least one signal (34a) from the at least one detection sensor (28) and to determine an aseptic fault of the sterile volume (23) on the basis of the at least one received signal (34a).

16 Claims, 5 Drawing Sheets

(58) Field of Classification Search
CPC .............. A61B 2018/00642; A61B 2018/0066;
A61B 2018/00714; A61B 2018/00738;
A61B 2018/00785; A61B 2018/00898;
A61B 2018/1892; A61B 2018/00011;
A61B 2018/00303; A61B 2018/1405;
A61B 2018/183; A61B 18/1477; A61B
2017/00128; A61B 2017/00154; A61B
2018/00005; A61B 2018/00029; A61B
2018/00273; A61B 2018/00321; A61B
2018/00565; A61B 2018/00702; A61B
2018/00708; A61B 2018/00732; A61B
2018/00761; A61B 2018/00779; A61B
2018/00791; A61B 2018/00803; A61B
2018/00904; A61B 2018/00982; A61B
2018/1838; A61B 2018/1853; A61B
2018/1861; A61B 2018/1869; A61B
2034/101; A61B 2034/107; A61B 34/10;
A61B 34/25; A61B 90/11; A61B 1/00;
A61B 3/00; A61B 5/00; A61B 6/00;
A61B 2576/00; A61B 2562/00; A61B
2560/00; A61B 2505/00; A61B 2503/00;
A61B 2218/00; A61B 2217/00; A61B
90/00; A61B 50/00; A61B 7/00; A61B
8/00; A61K 2039/53; A61K 2039/54;
A61K 2039/70; A61K 31/505; A61K
39/00; A61K 39/0011; A61K 39/001102;
A61K 39/001111; A61K 39/001162;
A61K 39/001182; A61K 39/12; A61K
45/06; A61K 47/548; A61K 6/00; A61K
8/00; A61K 9/00; A61K 2800/00; A61K
2300/00; A61K 2239/00; A61K 2236/00;
A61K 2123/00; A61K 2121/00; A61K
51/00; A61K 49/00; A61L 2202/25; A61L
2/20; A61L 2/22; A61L 2/24; A61L
2101/34; A61L 2202/14; A61L 2209/21;
A61L 9/02; A61L 9/14; A61L 2/00; A61L
9/00; A61L 11/00; A61L 2430/00; A61L
2420/00; A61L 2400/00; A61L 2300/00;
A61L 2209/00; A61L 2202/00; A61L
2101/00; A61L 12/00; A61L 15/00; A61N
1/306; A61N 1/327; A61N 1/00; A61N
2/00; A61N 5/00; A61N 7/00; C07C
31/08; C07K 14/415; C07K 14/005;
C12N 15/8242; C12N 15/8255; C12N
15/8261; C12N 15/8269; C12N 15/827;
C12N 15/8293; C12N 15/8297; C12N
2770/24134; C12N 2770/24122; Y02A
40/146; C12P 7/06; Y02E 50/10; Y02E
10/00; Y02E 20/00; Y02E 30/00; Y02E
40/00; Y02E 50/00; Y02E 60/00; Y02E
70/00; C12M 23/28; C12M 23/40; C12M
27/06; C12M 29/00; C12M 29/04; C12M
29/10; C12M 41/12; C12M 41/26; C12M
41/32; C12M 41/36; C12M 41/44; C12M
41/48; G16H 40/20; C07H 21/04; A61P
35/00; A61P 37/04; A24F 40/10; A24F
40/40; A61M 11/005; A61M 15/0001;
A61M 15/0021; A61M 15/0085; A61M
15/06; A61M 2016/0027; A61M
2205/0294; A61M 2205/33; A61M
2205/3584; A61M 2205/581; A61M
2205/583; A61M 2205/584; A61M
2205/587; A61M 2205/8206
USPC .......... 340/540, 541, 539.32, 565, 552, 571,
340/573.3, 686.1, 691.6, 692, 691.7,
340/3.43–3.44
See application file for complete search history.

(56) References Cited

U.S. PATENT DOCUMENTS

| | | | |
|---|---|---|---|
| 2010/0018168 A1* | 1/2010 | Bruijns | B67C 7/0033 53/317 |
| 2010/0192617 A1* | 8/2010 | Chae | F25D 17/08 62/449 |
| 2012/0057810 A1* | 3/2012 | De Klerk | A61L 2/26 383/41 |
| 2016/0175091 A1* | 6/2016 | Van Heugten | A61F 2/14 623/6.22 |
| 2017/0004357 A1* | 1/2017 | Bilet | G06Q 50/12 |
| 2018/0011502 A1* | 1/2018 | Brower | G01K 1/14 |

FOREIGN PATENT DOCUMENTS

| | | |
|---|---|---|
| KR | 101789197 | 10/2017 |
| WO | WO 2021/048449 B2 | 3/2021 |

OTHER PUBLICATIONS

Incremed Guard, Incremed AG, https://incremed.com.
Office Action issued in counterpart European Patent Application No. 21702645.9 18, 2023 (English translation provided).

* cited by examiner

SYSTEM FOR CONTROLLING A STERILE VOLUME

CROSS-REFERENCE TO RELATED APPLICATIONS

[1] This application is a national phase application under 35 U.S.C. § 371 of International Application No. PCT/EP2021/052056 filed 29 Jan. 2021, which claims priority to French Patent Application No. 2000886 filed 29 Jan. 2000. The entire contents of each of the above-referenced disclosures is specifically incorporated by reference herein without disclaimer.

The present invention relates to an aseptic control system. More particularly, the system controls asepsis in a sterile volume.

The control of asepsis in surgery is exercised personally through a person, who may be a nurse, called a moving bandager, who exercises human visual control. The moving bandager will subsequently be referred to as a bandager.

The bandager ensures that people performing a surgical procedure do not contact a non-sterile element during a surgical procedure.

If the bandager observes an aseptic fault due to inappropriate contact of one of the people participating in the surgical intervention with a non-sterile element, she must announce the aseptic fault and remedy it by applying a fault-dependent protocol. The aseptic fault results in the rupture of asepsis in the sterile volume. This rupture can be in the form of contact with a non-sterile element inside or outside the volume called sterile volume, or else the intrusion of a non-sterile element in the sterile volume. This inappropriate contact can concern any element likely to be in contact with the patient.

The other role of the moving bandager is to assist people performing the surgical procedure by providing them with the elements necessary for carrying out the procedure, such as instruments, drapes, staples, catheters, balloons, etc.

The bandager may have to leave the room to collect the element to be provided.

During this move, the bandager can no longer carry out her observation mission aiming at determining whether there has been an aseptic fault.

Furthermore, the bandager may not have detected an aseptic fault, exposing the patient to a care-related infection which, in the worst case, can take the form of massive contamination of the surgical wound.

The same observations apply in all situations where monitoring of strict compliance with asepsis is required, such as radiology, interventional cardiology or the implantation of a catheter in intensive care.

It would be useful to improve and secure the monitoring of a sterile volume and the detection of any aseptic fault and thus assist the bandager in this monitoring task, for example when the bandager is absent due to need.

The monitoring of a sterile volume is necessary in circumstances other than during a surgical intervention, such as in all industrial clean rooms or in food processing operations.

For economic and safety reasons, it would be useful to have a means for controlling asepsis that does not entirely depend on the human supervision faculties of a single person.

The present invention aims at providing a new system for controlling the asepsis in a sterile volume that meets this need.

To this end, a first aspect of the present invention relates to a system for controlling the asepsis of a sterile volume, for example in the medical, industrial and food-processing fields, the system comprising:
  at least one detection sensor which is configured to allow detecting an intrusion in the sterile volume, and to output a signal relating to said detection.
  a system for determining an aseptic fault of the sterile volume which is configured to receive the at least one signal from the at least one detection sensor and to determine an aseptic fault of the sterile volume on the basis of the at least one received signal.

The system for controlling the asepsis in a sterile volume may also comprise one or more of the features below, considered individually or in all technically possible combinations:
  the aseptic control system further comprising a graphical interface configured to allow to define the sterile volume, in particular the boundaries of the sterile volumes; and/or
  the system for controlling the asepsis in a sterile volume comprises at least one contact sensor connected to at least one non-sterile element and configured to allow the detection of any type of contact of an element located at least partly in the sterile volume with the at least one non-sterile element, the system for determining an aseptic fault of the sterile volume being configured to receive at least one signal from the at least one contact sensor and to determine an aseptic fault of the sterile volume on the basis of the signals received from the at least one contact sensor, and/or
  the control system comprises an alert device, the alert device being configured to emit an alert when an aseptic fault of the sterile volume is determined, and/or
  the alert system is deactivated manually, and/or
  the alert device is reactivated automatically, if no manual reactivation has taken place for a predetermined period of time, and/or
  the aseptic fault comprises an intrusion in the sterile volume, and/or
  the intrusion in the sterile volume corresponds to the intrusion of an element, for example non-sterile element, in the sterile volume, and/or
  the aseptic fault comprises contact between a sterile element located in the sterile volume with at least one non-sterile element, for example located outside the sterile volume, and/or
  the at least one detection sensor comprises a camera, and/or a photosensitive reflection sensor, and/or an infrared shower, and/or a distance sensor, and/or
  the at least one contact sensor comprises a chemical sensor, and/or an ink visible under certain frequencies, and/or an electrostatic sensor, and/or a pressure sensor, and/or a proximity sensor, and/or an inertial sensor, and/or
  which the at least one detection sensor is located outside the sterile volume,
  the control system is used in a surgical operating room, and/or
  the control system is used in a clean room, and/or
  the control system comprises an information storage device configured to store, over time, the data of the at least one signal coming from the at least one detection sensor and/or of the at least one signal coming from the at least one contact sensor, and/or the system comprises a display device, the display device being configured to display a representation of the stored data, and/or the control system comprises an authorisation level system configured to condition access to a volume, for example a room, comprising the sterile volume to a person having a required authorisation level, and/or the control system comprises a device for counting people configured to count the number of people in a volume comprising the sterile volume, and/or the control system comprises a device for controlling openings of a door allowing access to a volume comprising the sterile volume, the door opening control device is intended to control the number of times said door is opened and/or the duration of opening of said door during a given period of time, and/or the control system comprises a particle density sensor measuring the density of particles in suspension in the sterile volume and/or a volume comprising the sterile volume.

A second aspect of the present invention relates to a method for controlling the asepsis of a sterile volume, for example in the medical, industrial and food-processing fields, by a control system, the system comprising:

at least one detection sensor,
a system for determining an aseptic fault in the sterile volume, the method comprising:
a step of detecting an intrusion in the sterile volume by said at least one detection sensor of the control system,
a step of receiving by the determination system a signal relating to an intrusion output by the at least one detection sensor, and
a step of determining an aseptic fault of the sterile volume thanks to the determination system of the control system on the basis of the at least one received signal.

The method for controlling asepsis in a sterile volume may also comprise one or more of the features below, considered individually or in all technically possible combinations:

a step of defining a sterile volume using a graphical interface, and/or the system for controlling the asepsis in a sterile volume comprises at least one contact sensor connected to at least one non-sterile element, and the method comprises:

a step of detecting any type of contact of an element located at least partly in the sterile volume with at least one non-sterile element by said at least one contact sensor of the control system, a step of receiving by the determination system a signal relating to a contact output by the at least one contact sensor, and a step of determining an aseptic fault of the sterile volume thanks to the determination system of the control system on the basis of the signals received from at least one contact sensor, and/or the control system comprises an alert device and the method comprises a step of emitting an alert by the alert device of the control system when an aseptic fault of the sterile volume is determined, and/or the method comprises a step of manually deactivating the alert device, and/or the method comprises a step of automatically reactivating the alert device if no manual reactivation has taken place for a predetermined period of time, and/or the method comprises a step of detecting by the at least one detection sensor an intrusion in the sterile volume of an element, for example non-sterile element, and/or the method comprises a step of detecting by the at least one contact sensor a contact of a sterile element located in the sterile volume with at least one non-sterile element, for example located outside the sterile volume causing an aseptic fault by the at least one contact sensor, and/or the control system comprises at least one detection sensor selected from a camera, and/or a photosensitive reflection sensor, and/or an infrared shower, and/or a distance sensor, and/or the control system comprises at least one contact sensor selected from a chemical sensor, and/or an ink visible under certain frequencies, and/or an electrostatic sensor, and/or a pressure sensor, and/or a proximity sensor, and/or an inertial sensor, and/or the control system comprises at least one detection sensor located outside the sterile volume, and/or the control method is used in a surgical operating room, and/or the control method is used in a clean room, and/or the system comprises an information storage device, and the method comprises a step of storing, over time, the data of the at least one signal coming from the at least one detection sensor and/or of the at least one signal coming from the at least one contact sensor on an information storage device, and/or the system comprises a display device, and the method comprises a step of graphically displaying the data stored on a display device, and/or the method comprises a step of allocating an authorisation level to a person allowing the accessibility of a person to a volume, for example a room, comprising the sterile volume; and/or the method comprises a step of controlling the number of people in an operating room, when the control system determines that the number of people counted by the device for counting people has reached a threshold value, an alert is triggered, and/or the method comprises a step of controlling the number of openings of a door of the operating room, when the control system determines that the number of openings of the door counted by the device for counting the openings of a door has reached a threshold value, an alert is triggered, and/or the method comprises a step of controlling a density of particles in suspension in the operating room and/or the sterile volume, when the control system determines that the density is greater than a threshold value, an alarm is triggered.

A third aspect of the present invention relates to a system for controlling the asepsis of a sterile volume, for example in the medical, industrial and food-processing fields, the system comprising:

at least one contact sensor connected to at least one non-sterile element and configured to allow detection of any type of contact of an element located at least partly in the sterile volume with the at least one non-sterile element, a system for determining an aseptic fault of the sterile volume which is configured to receive at least one signal from the at least one contact sensor and to determine an aseptic fault of the sterile volume on the basis of the at least one signal received from the at least one a contact sensor.

The system for controlling the asepsis in a sterile volume may also comprise one or more of the features below, considered individually or in all technically possible combinations:

- the aseptic control system further comprising a graphical interface configured to allow to define the sterile volume, in particular the boundaries of the sterile volumes; and/or
- the system for controlling the asepsis in a sterile volume comprises at least one contact sensor connected to at least one non-sterile element and configured to allow the detection of any type of contact of an element located at least partly in the sterile volume with the at least one non-sterile element, the system for determining an aseptic fault of the sterile volume being configured to receive at least one signal from the at least one contact sensor and to determine an aseptic fault of the sterile volume on the basis of the signals received from the at least one contact sensor, and/or
- the control system comprises an alert device, the alert device being configured to emit an alert when an aseptic fault of the sterile volume is determined, and/or
- the alert system is deactivated manually, and/or
- the alert device is reactivated automatically, if no manual reactivation has taken place for a predetermined period of time, and/or
- the aseptic fault comprises an intrusion in the sterile volume, and/or
- the intrusion in the sterile volume corresponds to the intrusion of an element, for example non-sterile element, in the sterile volume, and/or
- the aseptic fault comprises contact between a sterile element located in the sterile volume with at least one non-sterile element, for example located outside the sterile volume, and/or
- the at least one detection sensor comprises a camera, and/or a photosensitive reflection sensor, and/or an infrared shower, and/or a distance sensor, and/or
- the at least one contact sensor comprises a chemical sensor, and/or an ink visible under certain frequencies, and/or an electrostatic sensor, and/or a pressure sensor, and/or a proximity sensor, and/or an inertial sensor, and/or
- which the at least one detection sensor is located outside the sterile volume,
- the control system is used in a surgical operating room, and/or
- the control system is used in a clean room, and/or
- the control system comprises an information storage device configured to store, over time, the data of the at least one signal coming from the at least one detection sensor and/or of the at least one signal coming from the at least one contact sensor, and/or
- the system comprises a display device, the display device being configured to display a representation of the stored data, and/or
- the control system comprises an authorisation level system configured to condition access to a volume, for example a room, comprising the sterile volume to a person having a required authorisation level, and/or
- the control system comprises a device for counting people configured to count the number of people in a volume comprising the sterile volume, and/or
- the control system comprises a device for controlling openings of a door allowing access to a volume comprising the sterile volume,
- the door opening control device is intended to control the number of times said door is opened and/or the duration of opening of said door during a given period of time, and/or
- the control system comprises a particle density sensor measuring the density of particles in suspension in the sterile volume and/or a volume comprising the sterile volume.

A fourth aspect of the present invention relates to a method for controlling the asepsis of a sterile volume, for example in the medical, industrial and food-processing fields, by a control system comprising
- at least one contact sensor connected to at least one non-sterile element, and
- a system for determining an aseptic fault in the sterile volume, the method comprising:
- a step of defining a sterile volume using a graphical interface, and/or
- a step of detecting any type of contact of an element located at least partly in the sterile volume with at least one non-sterile element by said at least one contact sensor of the control system,
- a step of receiving, by the determination system, a signal relating to a contact output by the at least one contact sensor, and
- a step of determining an aseptic fault of the sterile volume thanks to the determination system of the control system on the basis of a signal received from at least one contact sensor.

The method for controlling asepsis in a sterile volume may also comprise one or more of the features below, considered individually or in all technically possible combinations:
- the control system comprises at least one detection sensor, and the method comprises:
- a step of detecting an intrusion in the sterile volume by said at least one detection sensor of the control system,
- a step of receiving by the determination system a signal relating to an intrusion output by the at least one detection sensor, and
- a step of determining an aseptic fault of the sterile volume thanks to the determination system of the control system on the basis of the received signals, and/or
- the control system comprises an alert device and the method comprises a step of emitting an alert by the alert device of the control system when an aseptic fault of the sterile volume is determined, and/or
- the method comprising a step of manually deactivating the alert device, and/or
- the method comprising a step of automatically reactivating the alert device if no manual reactivation has taken place for a predetermined period of time, and/or
- the method comprising a step of detecting by the at least one detection sensor of an intrusion in the sterile volume of an element, for example non-sterile element, and/or
- the method comprising a step of detecting by the at least one contact sensor a contact of a sterile element located in the sterile volume with at least one non-sterile element, for example located outside the sterile volume causing an aseptic fault by the at least one contact sensor, and/or
- the control system comprises at least one detection sensor selected from a camera, and/or a photosensitive reflection sensor, and/or an infrared shower, and/or a distance sensor, and/or the control system comprises at least one contact sensor selected from a chemical sensor, and/or an ink visible under certain frequencies, and/or an electrostatic sensor, and/or a pressure sensor, and/or a proximity sensor, and/or an inertial sensor, and/or the control system comprises at least one detection sensor located outside the sterile volume, and/or the control method is used in a surgical operating room, and/or the control method is used in a clean room, and/or the system comprises an information storage device, and the method comprises a step of storing, over time, the data of the at least one signal coming from the at least one detection sensor and/or of the at least one signal coming from the at least one contact sensor on an information storage device, and/or the system comprises a display device, and the method comprises a step of graphically displaying the data stored on a display device, and/or the method comprises a step of allocating an authorisation level to a person allowing the accessibility of a person to a volume, for example a room, comprising the sterile volume; and/or the method comprises a step of controlling the number of people in an operating room, when the control system determines that the number of people counted by the device for counting people has reached a threshold value, an alert is triggered, and/or the method comprises a step of controlling the number of openings of a door of the operating room, when the control system determines that the number of openings of the door counted by the device for counting the openings of a door has reached a threshold value, an alert is triggered, and/or the method comprises a step of controlling a density of particles in suspension in the operating room and/or the sterile volume, when the control system determines that the density is greater than a threshold value, an alarm is triggered.

The invention will be better understood in light of the following description in the context of a surgical operation, which is given for information only and which is not intended to limit said invention, accompanied by the figures below.

In the various figures, similar elements are designated by identical references. Furthermore, the various elements are not necessarily represented to scale in order to have a view making it easier to understand the invention.

Figure 1:
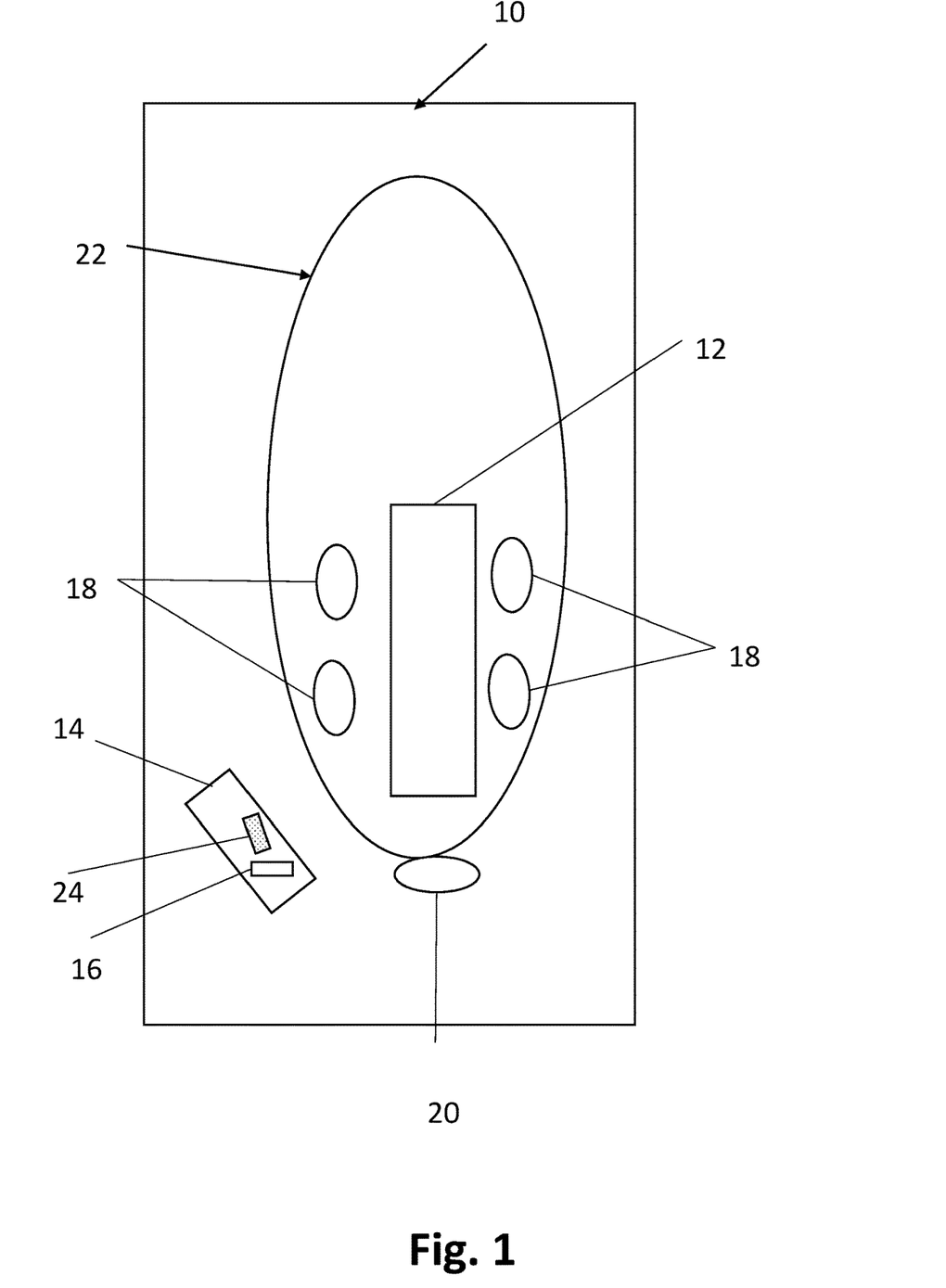
FIG. 1 is a schematic representation of a surgical operating room according to the prior art.

FIG. 1 is a schematic representation of a surgical operating room 10 according to the prior art. The surgical operating room 10 comprises an operating table 12 and a tool support table 14. An element 16 is disposed on the table 14. The element 16 can more particularly be an instrument intended to be used by a person 18 in charge of the surgical intervention. A person named bandager 20 attends and assists the people 18 performing the surgery. The bandager 20 defines a volume called sterile volume 22. The bandager 20 ensures that the people 18 performing the surgical intervention do not contact a non-sterile element 24.

The non-sterile element 24 can be found in the sterile volume 22 defined by the bandager 20 as shown in FIG. 1. But this non-sterile element 24, contacting at least one of the people 18, can be located outside the sterile volume 22.

The bandager 20 cannot ensure permanent control of the sterile volume 22 if the bandager 20 is required to perform a task leading her to take her gaze away from the sterile volume 22. It is therefore necessary to compensate for the surveillance rupture of the bandager 20 when the latter performs other tasks.

Figure 2:
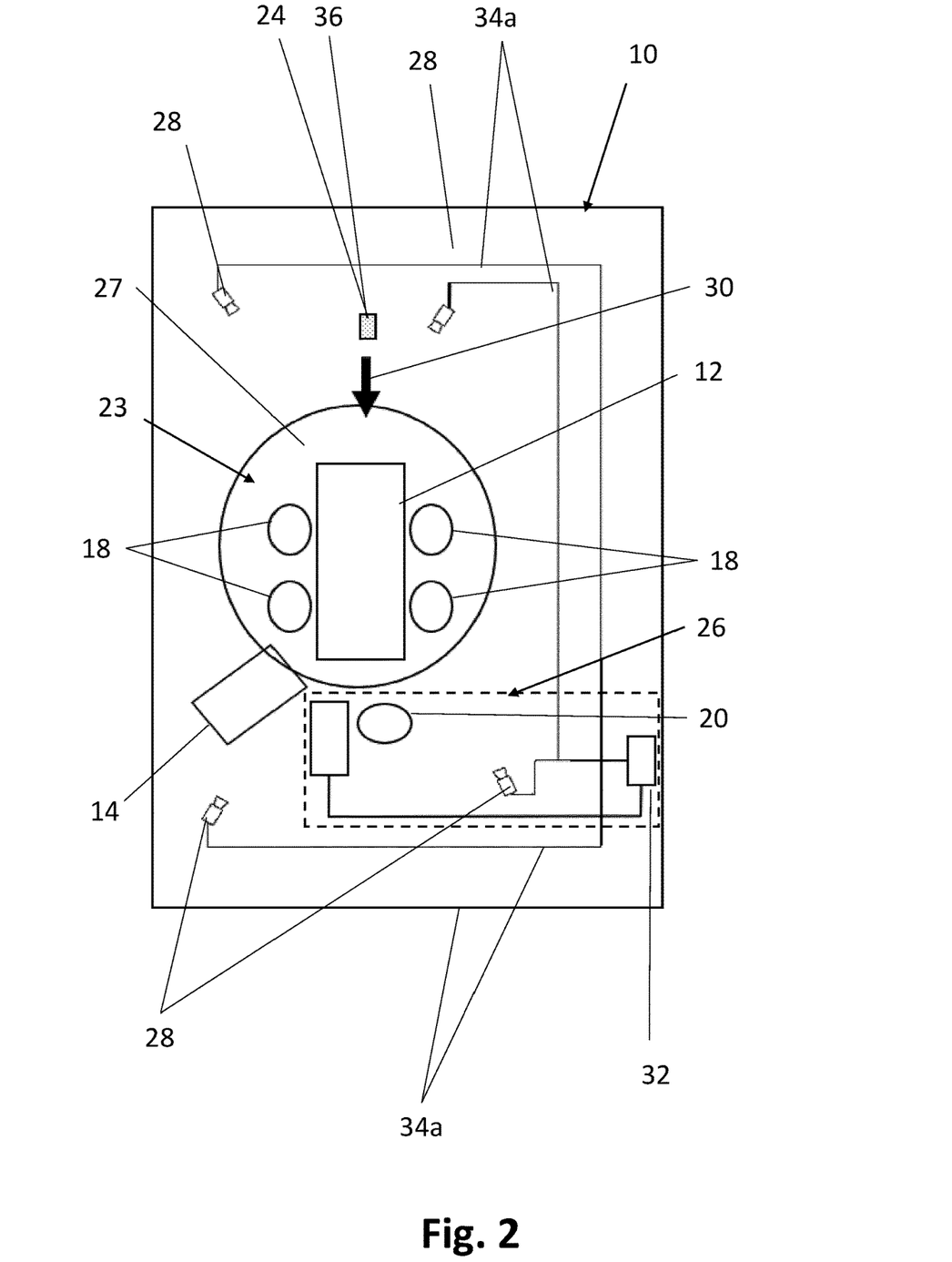
FIG. 2 is a schematic representation of a surgical operating room according to a first embodiment of the invention.

FIG. 2 is a schematic representation of a surgical operating room 10 according to a first embodiment of the invention.

Similarly to FIG. 1, the surgical operating room 10 shown in FIG. 2 comprises an operating table 12 and a tool support table 14. An element 16 (illustrated in FIG. 1) can be disposed on the table 14. The element 16 can more particularly be an instrument intended to be used by a person 18 in charge of the surgical intervention. A bandager 20 assists the people 18 performing the surgery. The bandager 20 can be located outside the sterile volume 23.

A system 26 for controlling asepsis in a sterile volume 23 is shown in FIG. 2. The control system 26 predefines a sterile volume 23. In a particular embodiment, the bandager can predefine the sterile volume 23 through a graphical interface 46 (shown in FIG. 4). This sterile volume 23 defines a sanctuary zone 27 delimited by the contours of the sterile volume 23. The sanctuary zone is considered distinctly from the sterile volume 23. In this way, the sanctuary zone 27 can comprise a non-sterile element 24 within the volume 23. The sanctuary zone may further comprise a person, for example the bandager 20 or the persons 18 performing the surgical intervention. In this way, during the predefinition of the sterile volume 23, comprising the sanctuary zone 27, a non-sterile element or a person can be present in the sterile volume 23 without triggering an alert by the simple fact of the presence in the sterile volume. The elements disposed in the sanctuary zone 27 are considered by the control system 26 to be sterile. The control system 26 comprises at least one detection sensor 28. The detection sensors 28 are intended to detect an intrusion 30 of a non-sterile element 24 in the sterile volume 23.

The control system 26 further comprises a system 32 for determining an aseptic fault in a sterile volume 23. The determination system 32 is configured to receive at least one signal 34a from at least one detection sensor 28. During an intrusion 30, in the sterile volume 23, of an external element 36, for example a non-sterile element 24 as illustrated in FIG. 2, the signal 34a from the at least one sensor 28 received by the determination system 32 allows to detect that an external element 36 has been introduced into the sterile volume 23. From this signal 34a and the detection of an intrusion which is deduced therefrom, the determination system 32 determines the presence of an aseptic fault of the sterile volume 23.

Advantageously, such a determination system 32 allows to be able to permanently monitor a possible intrusion 30 in the sterile volume 23, even if the bandager 20 is required to move to look for an instrument or any element necessary for the continuation of the procedure. This allows to overcome the problem of the temporary absence of the bandager in her movement she can no longer carry out her task of controlling the sterile volume.

Indeed, thanks to the prior definition of the sterile volume and the data processing, 34a, the system 32 determines whether the sanctuary zone 27 has been crossed. For example, if the sensors 28 are cameras, the system 32 will measure using image processing algorithms whether the borders defining the sterile volume 23 have been crossed. Unlike human control, this device will be able to verify the integrity of the sanctuary zone from several points of view at the same time.

The determination system 32 may comprise a process including an image processing step and a step 30 of detecting an intrusion in the sterile volume 23. This image processing step can be done in real time. More particularly, the detection of the intrusion 30 is done by the detection sensors 28.

Figure 3:
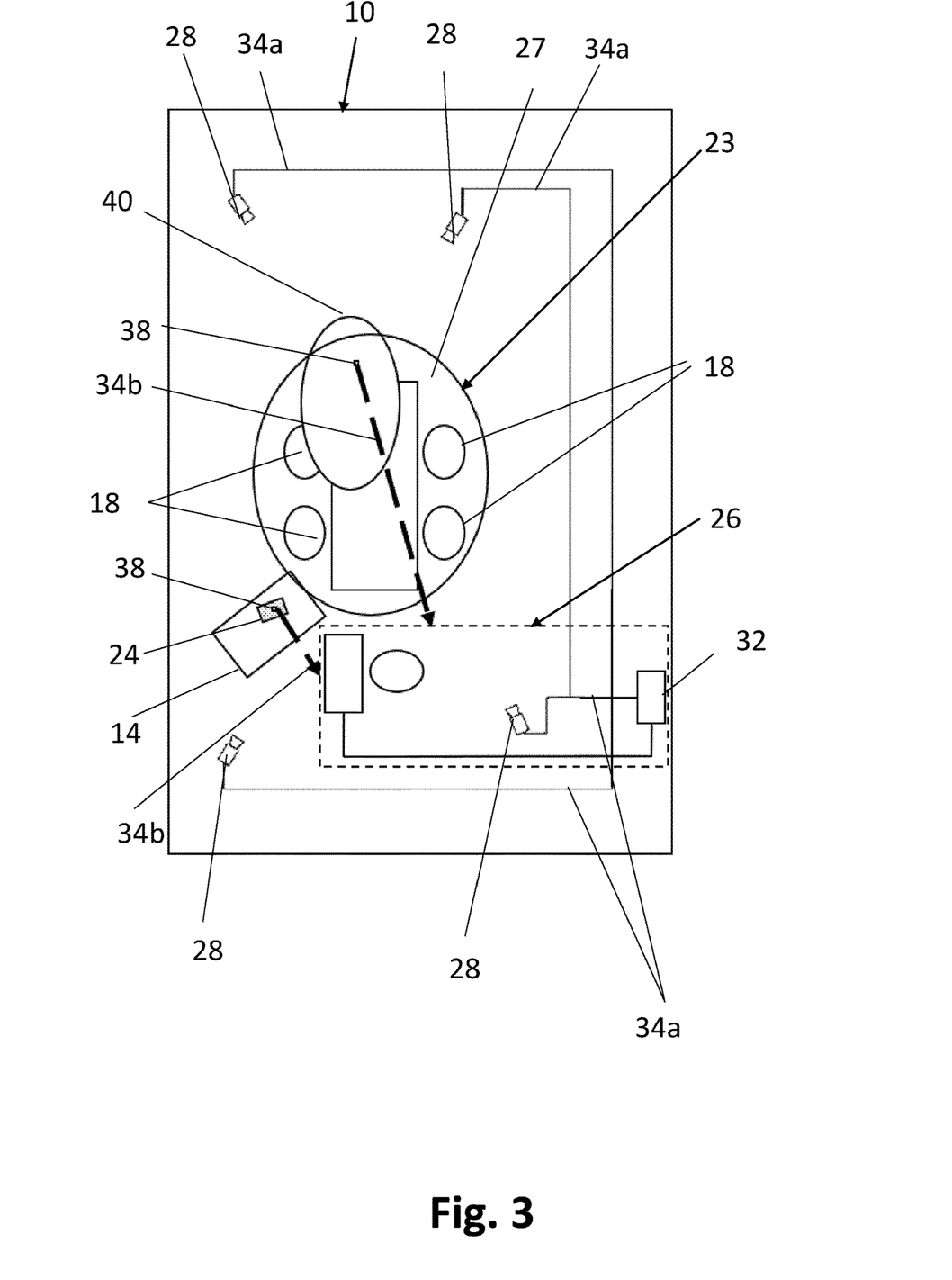
FIG. 3 is a schematic representation of a surgical operating room according to a second embodiment of the invention.

FIG. 3 is a schematic representation of a surgical operating room 10 according to a second embodiment including the features of the first embodiment illustrated in FIG. 2.

Furthermore, the control system 26 comprises at least one contact sensor 38 connected to a non-sterile element 24. The non-sterile element 24 can for example be an instrument disposed on the table 14 or an operating light 40, only one handle of which is sterilised.

A person 18 may be provided with equipment, more particularly a cap which could involuntarily contact a part of the operating light 40 which is not sterile.

This non-sterile element 24 can be located in the sanctuary zone 27 as illustrated in FIG. 3 or at least partially outside the sanctuary zone 27 and therefore the sterile volume 23. The non-sterile element 24, connected to a contact sensor 38 can also be located completely outside the sterile volume 23 (not shown).

When a non-sterile element 24 provided with a contact sensor 38 contacts a person 18, 20, a signal 34b is transmitted to the determination system 32. The determination system 32 is configured to receive the signal 34b emitted by the contact sensor 38 and to determine an aseptic fault on the basis of the signals 34b received from at least one contact sensor 38.

Optionally, the aseptic fault is determined on the basis of signals 34a, 34b from at least one contact sensor 38 and at least one detection sensor 28.

The at least one contact sensor 38 allows to detect the contact of a person with a non-sterile element 24 already present in the sanctuary zone 27 or outside the sterile volume 23.

This second embodiment is complementary to the first embodiment and allows to detect a possible aseptic fault independently of the intrusion 30 of an element in the sterile volume 23 and in addition to the supervision of the bandager 20.

Figure 4:
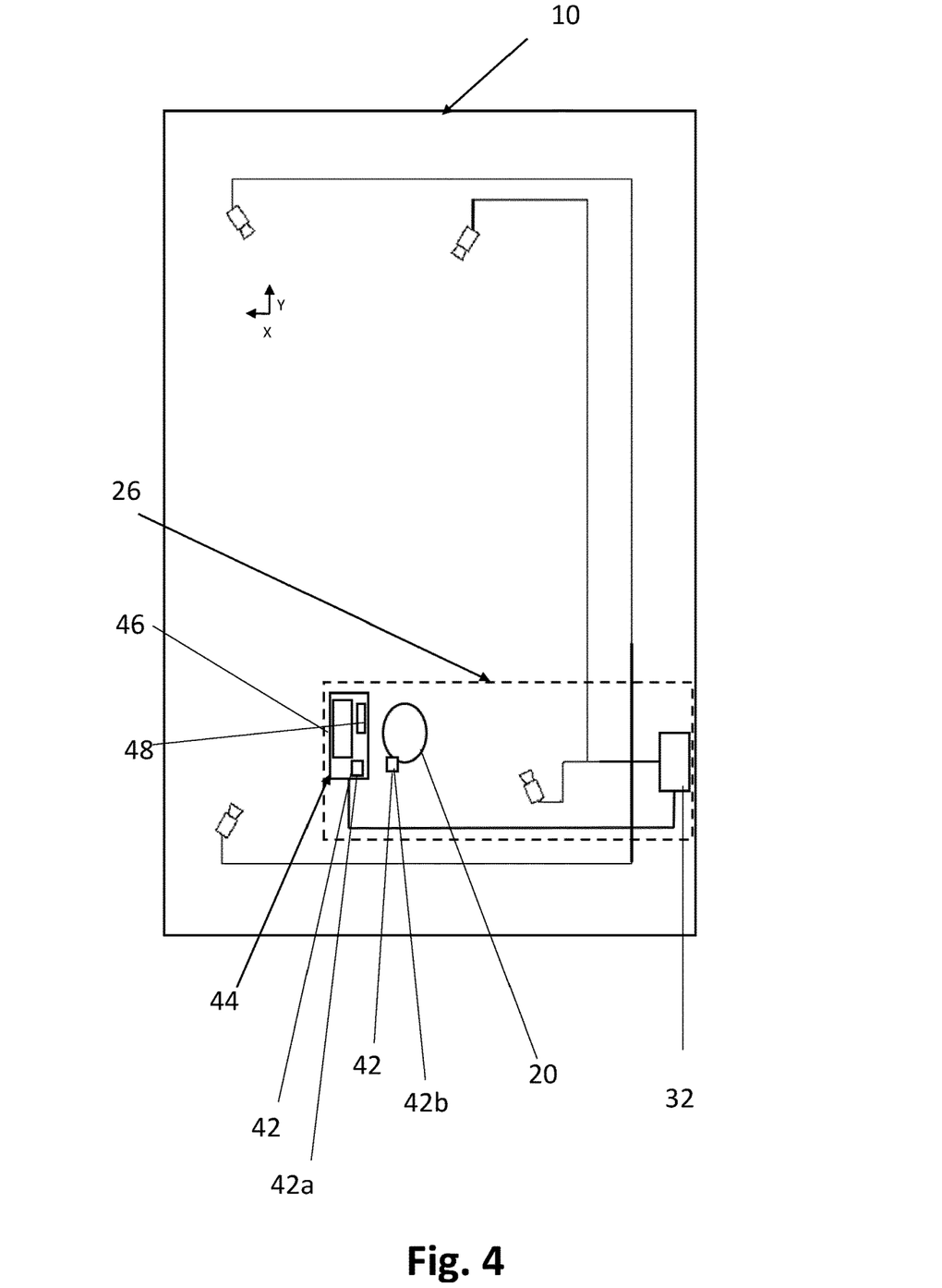
FIG. 4 is a partial schematic representation of a surgical operating room according to a third embodiment of the invention.

FIG. 4 is a partial schematic representation of a surgical operating room 10.

The control system 26 may comprise an alert device 42. The alert device 42 is configured to emit an alert when an aseptic fault of the sterile volume is determined by the determination system 32.

The monitoring device 44 may comprise the determination system 32.

In a particular embodiment, the alert device 42 may also be a device 42a disposed on a monitoring device 44 located in the surgical operating room 10.

The monitoring device 44 is a fixed device, preferably disposed in the surgical operating room 10.

The monitoring device 44 is comprised in the control system 26, and allows to transmit to the bandager 20 an alert signal, using the alert device 42a, when an aseptic fault of the sterile volume 23 is determined.

The alert signal of the alert device 42a can be visual and/or audible and/or vibratory.

In a particular embodiment of the invention, the determination system 32 and the monitoring device 44 are disposed in the same enclosure.

In another particular embodiment, the alert device 42 can also be a portable alert device 42b.

The alert device 42b is connected by a wireless connection to the determination system 32 and can emit an alert signal which is visual and/or audible and/or in the form of a vibration when an aseptic fault of the sterile volume 23 is determined.

Optionally, as illustrated in FIG. 4, the surgical operating room 10 comprises a monitoring device 44 provided with an alert device 42a and the bandager 20 has a portable alert device 42b.

The alert signal can be visual and/or audible and/or a vibration of the portable alert device 42b. The portable device 42b can be a vibrating and/or sound connected bracelet, and/or else an electronic tablet.

Advantageously, the alert device 42, 42a, 42b allows to alert the bandager 20 that a risk of aseptic fault has been determined.

In this way, the bandager 20 can act to restore asepsis, for example she can indicate to the person 18 involved in the aseptic fault to carry out a sterilisation procedure in order to be again completely in a sterile environment.

Advantageously, to avoid an untimely alert signal from the alert device 42, the bandager 20 has the option of manually deactivating the alert device 42, for example to allow the voluntary introduction of a sterile element in the sterile volume 23. The bandager 20 can also decide to manually deactivate at least one detection 28 or contact 38 sensor. Furthermore, the bandager 20 can also indicate using the graphical interface 46 that an intrusion 30 of an element or a person in a predefined zone, using the graphic interface 46, of the sterile volume 23 does not constitute an aseptic fault.

This one-time deactivation can be done using a telephone application, a computer program, a connected object, or a mechanical or electronic actuator disposed on a fixed element of the control system such as the monitoring device 44 or on a portable element such as the portable alert device 42b, or the like.

The alert device 42 reactivates automatically, if no manual reactivation has taken place for a predetermined period of time.

The predetermined period of time can be of the order of 1 minute and, more preferably of the order of 30 seconds.

Advantageously if the bandager 20 forgets to reactivate the alert system 42, the control system 26 can again be operational. If the control system had not reactivated, the bandager would not have been able to benefit from assistance in detecting an aseptic fault in the sterile volume 23.

In a particular case of the invention, the aseptic fault in the sterile volume 23 is caused by an intrusion 30 in the sterile volume.

Advantageously, as indicated in the description of FIG. 2, an intrusion 30 in the sterile volume 23 is detected using at least one detection sensor 28.

Preferably, the control system 26 is able to determine that the intrusion 30 in the sterile volume 23 corresponds to the intrusion 30 of a non-sterile element 24 in the sterile volume 23.

This determination can be made for example by means of RFID markers or any other type of marker (barcodes, markers sensitive to a specific light, . . . ), which can be detected by the detection sensor 28, disposed on a container of an element introduced into the sterile volume 22.

The bandager 20 can also indicate to the control system 26 before or during the surgical intervention that the element which is going to be introduced corresponds to a sterile element. In this way, the control system 26 is optimised so as not to transmit an alert signal to the bandager 20 when the introduced element is provided with a marker indicating that the content is sterile.

In a particular case of the invention, the aseptic fault comprises a contact of a sterile element located in the sterile volume 23 with at least one non-sterile element 24, for example located outside the sterile volume 23. Advantageously, the presence of a contact sensor 38 on the non-sterile elements 24, allows to detect a contact of the person 18, or of one of his equipment with the non-sterile element 24.

The non-sterile element 24 provided with a contact sensor 38 can be located within the sanctuary zone 27 delimited by the contours of the sterile volume 23 or outside the sterile volume 23.

The at least one detection sensor 28 comprises a camera, and/or a photosensitive reflection sensor, and/or an infrared shower, and/or a distance sensor. An arrangement of several types of detection sensors 28 can be considered.

In one embodiment, the detection sensor 28 may be a camera, the signal of which corresponds to the images recorded by the camera or anamorphic images.

The camera may be a wide angle camera.

Preferably, the detection sensors 28 are at least three in number and arranged in a specific way to allow triangulation.

The arrangement of the sensors can allow to define in a three-dimensional way a sterile volume 23 in a first step and to detect in real time an intrusion of an element in the sterile volume 23 in a second step.

The sterile volume 23 can be predefined beforehand by the bandager 20 using the control system 26.

In a particular embodiment, the sterile volume 23 is configured using a graphical interface 46 comprised in and/or associated with the monitoring device 44.

The bandager 20 can redefine the sterile volume 23 at any time before and during the surgical intervention. The sterile volume 23 can be configured as the volume formed by a polyhedron whose vertices are defined on the graphical interface 46.

Several other methods are also possible for defining the sterile volume:
- the definition of a two-dimensional geometric shape (circle, oval, rectangular square, ellipse, . . . ) from a plane or a top view using a detection sensor 28, so that the sterile volume 23 is delimited laterally (along an axis X shown in FIG. 4) and in depth (along an axis Y shown in FIG. 4) by the two-dimensional geometric shape and in height by a predetermined height,
- the sterile volume 23 can also be formed from an addition or subtraction of volumes (cylinders, spheres, cube, straight block, . . . ).

The examples of definition of the sterile volume 23 mentioned above are not limiting, any other mode of definition of the sterile volume 23 can also be considered by the present invention.

In a particular embodiment, the definition of the sterile volume 23 can be made from QR Code tape-type markers disposed, for example by the bandager 20, in the surgical operating room 10 and detected by the detection sensors 28. The control system detects the position of the QR Code tapes and defines the sterile volume 23. The predefined sterile volume 23 is then verified by the bandager 20.

Figure 5:
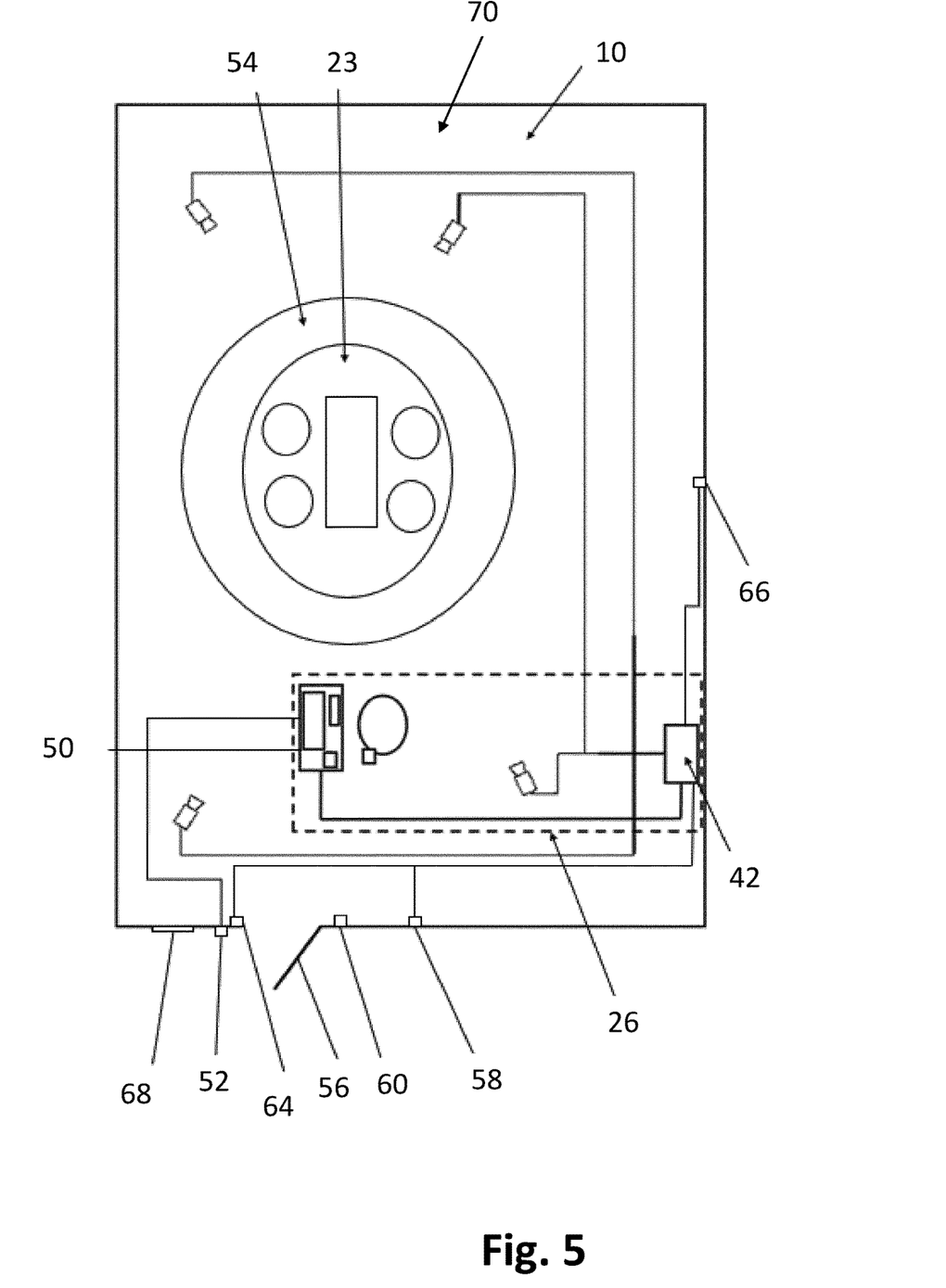
FIG. 5 is a partial schematic representation of a surgical operating room according to a fourth embodiment of the invention.

FIG. 5 is a partial schematic representation of a surgical operating room 10.

The sterile volume 23 forms a sub-volume of the surgical operating room 10. The sub-volume differs from the volume of the surgical operating room 10 in that at least part of the volume of the surgical operating room 10 is excluded from the sub-volume formed by the sterile volume 23.

This sub-volume defining the sterile volume 23 can be defined manually using the control system 26 or from QR Code tape-type markers disposed, for example by the bandager, in the surgical operating room 10 and detected by the detection sensors.

A precise definition of the sterile volume as a sub-volume of the surgical operating room 10 allows to better determine any intrusion in the sterile volume. The sterile volume 23 is defined so that in any part of the sterile volume 23, a detection sensor 28 can detect an intrusion.

If for at least a portion of the sterile volume 23, the detection sensor 28 is not capable of detecting an intrusion of a non-sterile element 24 in the sterile volume 23, the control system 26 may not detect an aseptic fault taking place in said sterile volume 23.

In a particular embodiment, the definition of the sterile volume 23 is performed automatically by the control system 26 and subject to validation by the bandager 20.

Regardless of how the sterile volume 23 is defined, its height can either be defined precisely using the graphical interface or by the spatial boundaries of the surgical operating room, namely the floor and the ceiling.

In one implementation of the invention, the height of the sterile volume 23 is defined by the floor and the ceiling of the surgical operating room 10. It is possible that the bandager 20 readjusts the height of the sterile volume 23 so as not to include the operating light 40 if the latter is moved. In this way, if a person 18 handles the operating light 40 by its sterile handle to lower it, the operating light 40 does not enter the redefined sterile volume 23.

Regardless of the mode of definition of the sterile volume 23, the definition can be done using the graphic interface 46 and independently or with the use of at least one image capture obtained by at least one of the detection sensors 28.

The detection of the intrusion is carried out using the control system 26 which allowed the definition of the sterile volume 23 and the detection sensors 28 which by their arrangement allow triangulation. The control system 26 can implement an image processing method from the signals 34*a*, in the form of image capture. From these real-time image captures, the determination system 32 can determine whether there has been an intrusion of an element in the sterile volume 23 predefined, for example, by an image processing algorithm which detects the line crossing.

In a particular embodiment, the at least one detection sensor 28 comprises a camera. Preferably, several cameras to allow triangulation.

Advantageously, the use of cameras is elementary and does not require significant qualification for the bandager 20 or an external worker installing the control system 26 in the surgical operating room 10. Furthermore, the movement of the cameras is simple to execute.

In the event that there is triangulation of the cameras, a recalibration of the system may be necessary following the movement of the cameras.

The perceived camera signal 34*a* allows the determination system 32 to detect an intrusion 30 in the sterile volume 23. Preferably, the cameras are able to detect information on a specific marker such as a sticker and thus recognise if an element introduced into the sterile volume 23 is a sterile element or a non-sterile element 24 devoid of the specific marker characterising sterile elements. The cameras can be easily connected to each other or to the determination system 32 to carry out a triangulation.

According to another embodiment, at least one detection sensor 28 is a photosensitive reflection sensor. This type of sensor allows to define immaterial barriers delimiting the sterile volume 23. These sensors allow the detection of any type of intrusion through the barrier.

In the event that a person 18 moves back sufficiently, the detection sensor 28 detects a crossing outside the sterile volume. The sensor 28 then transmits a signal 34*b* to the determination system 32 which then determines the presence of an aseptic fault. The alert device 42 is configured to emit an alert when an aseptic fault of the sterile volume is determined by the monitoring device 32.

In the event that a person 18 moves back sufficiently, the detection sensor 28 detects a crossing outside the sterile volume. The sensor 28 then transmits a first signal 34*b*, coming from the photosensitive sensor, to the determination system 32. The presence of another detection sensor 28 in the form of a camera 28 allows the transmission of a second signal 34*b*, coming from the camera, to the determination system 32. The determination system 32 determines from the combined first and second signals 34*b* whether there has really been an aseptic fault.

Advantageously, photosensitive reflection sensors are very reliable.

According to another embodiment, at least one detection sensor 28 is an infrared shower. This type of sensor is often used for automatic door opening as soon as a person is detected nearby. Advantageously, these sensors are easy to install and highly accurate.

According to another embodiment, at least one detection sensor 28 is a distance sensor. These sensors can more particularly be ultrasound sensors which allow detecting whether an element is present close to the sensor and to determine whether it is close to the sterile volume 23 by determining its distance with respect to the sterile volume 23. Thus, the ultrasound distance sensors can be placed on the floor or on the ceiling so as to define the section of the sterile volume on the floor. If an element or a person comes close to the sensor, and more particularly above the distance sensor, then the detection sensor 28 sends a signal 34*a* to the determination system 32 to indicate to it that a person or an element has moved closer to the sensor at a distance less than a predefined threshold value. The determination system 32 thus determines whether an intrusion 30 in the sterile volume 23 has taken place.

According to another embodiment, at least one detection sensor 28 is a distance sensor, and more particularly a laser sensor. Advantageously, the laser sensors are endowed with high precision.

According to the second embodiment of the invention, the control system 26 comprises at least one contact sensor 38. The at least one contact sensor 38 may comprise a chemical sensor, and/or an electrostatic sensor, and/or a pressure sensor, and/or a proximity sensor, and/or an inertial sensor. The non-sterile elements 24 intended to be provided with a contact sensor are, for example, a bag of liquid, a mat or else an operating light.

According to a particular mode of the second embodiment, at least one contact sensor 38 is a chemical sensor. The equipment of a person 18 can be coated with an invisible sterile ink that leaves a mark on a non-sterile element 24 when the coated equipment of the person 18 contacts a non-sterile element 24. In combination with an image capture means, such as a camera acting as a detection sensor 28, the mark can be detected by the control system 26 and an alert signal informing of a possible aseptic fault will be transmitted to the bandager 20 via the alert device 42. The mark can be a coloured mark or an invisible mark detected in the ultraviolet range. In an alternative, it is the non-sterile elements 24 which are coated with the ink.

According to another embodiment of the second embodiment, at least one contact sensor 38 is an electrostatic sensor. These sensors can be disposed on the equipment of the people 18, such as connected clothing. Any sterile element is defined at the same electric potential and different from the electric potential of the non-sterile elements 24. Thus the contact of electrostatic sensors having a potential allows the transmission of a signal 34*b*, via a wireless transmission, to the determination system 32 to warn it of a change in potential. The determination system 32 deduces from this a contact of a person 18 with a non-sterile element 24 and transmits an alert signal via the alert device 42 to warn the bandager 20.

According to another embodiment of the second embodiment, at least one contact sensor 38 is a pressure sensor. The pressure sensor is disposed on the non-sterile element configured to detect pressure from a person 18 on said contact sensor 38 upon contact with the non-sterile element 24. The wireless transmission of a signal 34*b* indicating that pressure has been detected by one of the sensors 38 allows the determination system 32 to determine that a person 18 has contacted a non-sterile element 24. The determination system 32 can then transmit an alert signal via the alert device 42 to warn the bandager 20.

According to another embodiment of the second embodiment, at least one contact sensor 38 is a proximity sensor. A proximity sensor can be positioned at a risk zone, and more specifically a non-sterile element 24. Thus as soon as a person 18 approaches the proximity sensor at a distance less than a predefined threshold, a signal 34*b* is transmitted, via a wireless transmission, to the determination system 32 which deduces an aseptic fault in the sterile volume 23. The determination system 32 can then transmit an alert signal via the alert device 42 to warn the bandager 20.

According to another embodiment of the second embodiment, the at least one contact sensor 38 is an inertial sensor, such as a gyroscope.

The inertial sensor is connected to a non-sterile element 24. In this way, if a person 18 contacts the non-sterile element 24, the latter undergoes a displacement which can be measured by the inertial sensor. The inertial sensor transmits, via a wireless transmission, a signal 34*b* indicating the displacement of the non-sterile element 24, to the determination system 32. The determination system 32 then determines that a person 18 has contacted a non-sterile element 24 and can then transmit an alert signal via the alert device 42 to warn the bandager 20.

Preferably, the bandager 20 has a contact sensor 38 on each of the non-sterile elements that risk contacting one of the people 18 during the surgical intervention.

The contact sensors 38 can comprise an adhesive part to be connected to a non-sterile element 24. Preferably, the contact sensors 38 are in the form of stickers.

It should be noted that the invention is not limited to the sensors mentioned and covers any type and any combination of detection sensors 28 and contact sensors 38. Several types of detection sensors 28 can be used in a surgical operating room 10. Similarly, several types of contact sensors 38 may be used in a surgical operating room 10.

The at least one detection sensor 28 and the at least one contact sensor 38 can be located inside or outside the predefined sterile volume 23.

The at least one detection sensor 28 and the at least one contact sensor 38 can also be located partly inside the sterile volume 23.

In a particular embodiment, the aseptic control system is used in a surgical operating room 10.

The object of the invention is not limited to the embodiment described above concerning the detection of an aseptic fault in a surgical operating room 10.

The invention may also relate to the industrial or food-processing sector

Advantageously, the control system 26 has an information storage device 48 configured to store, over time, the data of at least one signal 34a coming from the at least one detection sensor 28 and/or of the least one signal 34b coming from the at least one contact sensor 38.

Preferably, the image capture obtained by the detection sensors 28 is stored continuously on the information storage device 48 in the form of video during the surgical intervention. Similarly, the signals 34b transmitted by the contact sensors 38 are stored on the information storage device 48.

In a particular embodiment, all the information stored on the storage device 48 corresponding to signals 34a, 34b coming from the at least one detection sensor 28 and/or from the at least one contact sensor 38 dating from over 6 hours are erased, continuously.

Preferably, the information corresponding to the signals 34a, 34b are stored throughout the duration of the operation without being erased.

In a particular embodiment, the control system 26 comprises a display device. The display device is configured to display a representation of the stored data.

Preferably, the display device is formed by the graphic interface 46. In this way, the control system 26 can provide the bandager 20, at the time of an alert, via the graphic interface 46, with a graphic representation corresponding to each of the signals 34a, 34b of each of the at least one detection sensor 28 and at least one contact sensor 38.

Preferably, the graphic representation corresponding to the at least one detection sensor 28 is an image capture. The image captured by each of the detection sensors 28 present in the surgical operating room 10 is displayed on the graphical interface 46. Regarding the graphical representation, on the graphical interface 46, corresponding to the signals 34b of the contact sensors 38 present in the surgical operating room 10, a change in colour of a character string may be associated with a change in the event-related signal 34b is detected by a contact sensor 38. In another embodiment, the display corresponding to the signals 34b of the contact sensors 38 can be in the form of a specific display, such as a numerical value as soon as an event is detected by a contact sensor 38.

In a particular embodiment, the bandager 20 references using the graphic interface 46 the position of non-sterile elements 24 provided with a contact sensor 38. A movement of the at least one referenced contact sensor 38 then results in a flashing or a change of colour of the latter at the graphic interface 46. The bandager can thus directly know the zone where a contact with a non-sterile object has taken place. Preferably, a zone around the referencing of the initial position of the non-sterile element 24 provided with the contact sensor 38 is highlighted on the graphic interface to indicate the zone where the contact took place.

In one embodiment, the representation corresponding to the signals 34b of the contact sensors 38, on the graphic interface 46, is in the form of a coloured display connected to said contact sensor 38, when an aseptic fault is detected. Preferably a colour is allocated to each contact sensor 38 to allow the bandager 20 to easily determine the location of the possible aseptic fault.

In one embodiment, the bandager 20, when defining the sterile volume 23 using the control system 26, indicates on the representation including the sterile volume 23 the position of the contact sensor 38. If the signal 34b emitted by a detection sensor 38 leads to the determination of an aseptic fault by the determination system 32, the graphic interface displays a sphere, a cylinder, or any other geometric shape, around the position where the contact sensor 38 is defined by the bandager when defining the volume. The geometric shape displayed on the graphic interface indicates to the bandager an area where the aseptic fault has potentially taken place.

The bandager 20 can, from these graphic representations, displayed on the graphic interface 46, determine whether the alert emitted by the alert device 42 really corresponds to an aseptic fault in the sterile volume 23.

In one embodiment, for each alert, the bandager 20 can, from an image capture of the at least one detection sensor 28, have the possibility of seeing in the form of a video of what happened 5 seconds before and 5 seconds after the image capture of an alert, more specifically 3 seconds before and 3 seconds after the image capture. Preferably, the bandager 20 has the possibility of stopping this video and obtaining an image capture at any time during the period of 10 seconds, more particularly 6 seconds, of the video. The bandager also has the possibility of consulting the videos recorded by each of said detection sensors 28 at any time. The bandager 20 has the possibility of reducing the reading speed. In a particular embodiment, the video can also be viewed with reverse playback, so as to see a later event before an earlier event. The bandager 20 can obtain an image capture from each of the at least one detection sensor 28 when it pauses the video playback.

In one embodiment, for each alert, the bandager 20 can, from an image capture of the at least one detection sensor 28, have the possibility of seeing in the form of a video corresponding to all information recorded on the information storage device 48 during the surgical procedure. The bandager 20 has the possibility of reducing the reading speed. In a particular embodiment, the video can also be viewed with reverse playback, so as to see a later event before an earlier event. The bandager 20 can obtain an image capture from each of the at least one detection sensor 28 when it pauses the video playback.

The implementation of a control system 26 in a surgical operating room 10 comprises a first step of setting up the control system 26 in the surgical operating room 10. This step particularly concerns the arrangement of the sensors, and more particularly of the detection sensors 28 in order for example to allow triangulation.

Once the control system 26 is arranged at least in part in the surgical operating room 10, the implementation of the control system 26 comprises a second step called the initialisation step. The initialisation can be done outside the future sterile volume 23 to be defined. Alternatively, the initialisation of the control system 26 comprising a third step of defining the sterile volume 23. The initialisation step also serves to initialise the detection sensors 28 and the contact sensors 38. This step allows to verify that the signals 34*a*, 34*b* of the detection 28 and contact 38 sensors are indeed transmitted to the control system 26 and to verify that the alert signal is indeed transmitted to the bandager 20 in the event of intrusion in the sterile volume 23 or of contact with a non-sterile element 24.

The third step consisting in the definition of the sterile volume 23 can be done manually via the graphic interface 46, semi-automatically by disposing tapes provided with a QR Code allowing the control system to define the sterile volume 23, or else the definition of the sterile volume 23 can be done completely automatically. Whether the definition of the sterile volume 23 is manual, semi-automatic, or automatic, confirmation from the bandager 20 remains necessary to ensure that the sterile volume 23 has been defined.

Furthermore, during a surgical intervention, the bandager 20 may also have to intervene on the control system so as to redefine the sterile volume 23 or to deactivate the alert.

Moreover, when the bandager 20 receives an alert signal, the bandager can see, in video form, the events that occurred shortly before and after corresponding to the selected image capture. This video corresponds to the signal 34*a* acquired continuously by the detection sensor 28 whose image capture has been selected by the bandager 20.

Furthermore, in a particular mode of use, the bandager 20 can review the data acquired from the signals 34*a*, 34*b* of the detection 28 and contact 38 sensors corresponding to a previous alert.

In a preferred embodiment, a control volume 54 forming a second volume encompassing the sterile volume 23, is automatically defined from the sterile volume 23. The control volume 54 is defined to extend from the delimitation of the sterile volume 23 by a distance at least greater than or equal to 1 metre.

The control volume 54 allows to improve the control of an intrusion in the sterile volume 23. Furthermore, the difference in volume between the control volume 54 and the sterile volume 23 defines the intervention zone, for example for a technician to intervene on an operating light.

In a particular embodiment, the control system 26 comprises an authorisation level system 50 comprising several authorisation levels. The authorisation system 50 is configured to condition the access of a person to a given volume 70.

The given volume 70 comprises the control volume 54 and the sterile volume 23.

The given volume 70 can be a room, for example an operating room 10.

The examples described below referring to an operating room 10 can be applied to a given volume 70, which is not necessarily an operating room 10.

In a particular embodiment, the authorisation system 50 is configured to condition the access of a person to different parts of the operating room 10 according to his authorisation level:

in the operating room 10 outside a control volume 54 and the sterile volume 23, in the operating room 10 and the control volume 54, outside the sterile volume 23, and in the operating room 10, the control volume 54 and the sterile volume 23.

The allocation of the authorisation level to personnel can be defined during the installation of the control system, for example through an existing database. The authorisation level allocated to each member of personnel can be modified at any time, once the control device 26 has been installed.

In a particular embodiment, the authorisation level can be allocated to medical personnel by the bandager 20 prior to the surgical operation.

Preferably, the authorisation level of medical personnel can be modified upstream or during a surgical operation, for example by the bandager 20, using the control system 26, so as to allow access to said medical personnel to the operating room 10 outside the control volume 54 and the sterile volume 23, to the control volume 54 outside the sterile volume 23, or else to the sterile volume 23.

In a particular embodiment, the bandager 20 authorises a person according to his name and/or his registration number and/or his medical specialty and/or competence his technical competence.

The allocation of an authorisation level can be materialised in the form of a badge, a QR code, a bar code, a pattern with a specific shape or a specific colour, or else an electronic tag such as an RFID sensor.

The allocation of the authorisation level can be materialised on a garment or on a gown.

In another embodiment, the control of the authorisation level can be carried out by facial recognition.

The authorisation level system 50 can control the authorisation level of a person using at least one control means 52 disposed outside the operating room 10 or a sensor detection device 28 disposed in the operating room 10. The control means 52 and/or the detection sensor can be a camera and/or an RFID reader.

The control system 26 can trigger an alert, through an alert device 42, if at least one detection sensor 28, located in the operating room 10, detects the presence or intrusion of a person with unauthorised authorisation level in the operating room 10, the control volume 54 or the sterile volume 23.

The authorisation level can be assigned according to the access zones granted by the bandager to the nursing personnel.

For example, personnel with "level 1" authorisation level are authorised to enter the operating room 10. Level 1 personnel may be present in the operating room 10 but are not permitted to enter the control volume 54 and the sterile volume 23.

If at least one detection sensor 28 detects the presence or intrusion of level 1 personnel in the control volume 54, an alert can be emitted by the alert device 42.

Personnel with a "level 2" authorisation level may be authorised to be present in the operating room 10 and to enter the control volume 54.

Level 2 personnel are authorised to operate in the operating room 10 and in the control volume 54, outside the sterile volume 23.

If at least one detection sensor 28 detects the presence or intrusion of level 2 personnel in the sterile volume 23, an alert is emitted by the alert device 42.

For example, level 2 personnel are authorised to intervene in an operating room 10 to adjust or repair a technical device such as an operating light 40.

Personnel with a "level 3" authorisation level may be authorised to be present in the operating room 10, to enter the control volume 54 and the sterile volume 23.

Level 3 personnel are typically the doctor(s) and/or nurse(s) present in the operating room 10 involved in the surgical operation on the patient.

The control system 26 also allows the display of information outside the surgical operating room 10. The display of information is done using a display means 68. The display means may be a video screen.

To guarantee asepsis in the sterile volume 23, it may be advantageous to limit the opening and closing of a door 56 of the operating room 10, and thus limit the intrusion of particles in suspension, such as viruses or bacteria, and contaminate the sterile volume 23.

In a particular embodiment, the control system 26 comprises a device 58 for counting people in the given volume 70. The device 58 for counting people is for example disposed near a door 56 allowing access to the given volume 70. The counting device 58 is connected to the control system 26 by wire or using a wireless network. The counting device 58 is connected to a person detection sensor to determine the number of people entering and leaving the given volume 70, such as a surgical operating room 10. The counting device 58 is intended to count people entering and leaving the given volume 70. The control system 26 comprises a first threshold value related to the device 58 for counting people.

In a particular embodiment, the person detection sensor connected to the device for counting people can be an optical sensor such as a camera, pressure sensors such as Technis Counting® technology sensors, distance sensors, infrared sensor, thermal sensor, or a combination of these sensors In a particular embodiment, if the control system 26 determines that the number of people present in the given volume 70 or the difference between the number of people entering and leaving the surgical operating room 10 is equal to the first threshold value, a first warning signal is emitted. The first warning signal can be emitted by the alert device 42. When the first threshold value is reached, the display means 68, disposed outside the operating room 10 or at least visible from the outside of the operating room 10, displays an information message, for example a red background and a message such as "Entry prohibited: Infectious Risk Danger".

In a particular embodiment, the control system 26 comprises a second threshold value. The second threshold value is lower than the first threshold value. When the control system 26 determines that the second threshold value is reached by the device 58 for counting people, a second warning signal is emitted. The second warning signal can be emitted by the alert device 42. When the second threshold value is reached, the display means 68, disposed outside the operating room 10 or at least visible from the outside of the operating room 10, displays an information message, for example an orange background and a message such as "Access authorisation is required to enter the operating room".

When the first threshold value is reached, the bandager can manually lock the door 56 of the operating room.

When the door 56 is locked, people in the surgical operating room 10 can still exit by deactivating the lock of the door 56 using an unlocking means 60. The unlocking means 60 is located in the surgical operating room 10. The unlocking means is a button near the door 56 or a latch disposed partly on the door 56.

In a particular embodiment, a control means 52 is located near the door 56 outside the operating room 10. The control means allows the control of the identity and/or the technical competence of a person wishing to enter the operating room 10. The control means 52 can be a camera or an RFID reader or a combination of these means.

If the first or the second threshold value is reached, the bandager 20 can authorise or refuse the access of a person detected by the control means 52:
- to the operating room 10 outside a control volume 54 and the sterile volume 23,
- to the operating room 10 and the control volume 54, outside the sterile volume 23, and
- to the operating room 10, the control volume 54 and the sterile volume 23.

If the bandager decides to authorise the person to enter the operating room 10, the display means 68 can display a message, for example a green background and a message such as "You are authorised to enter the operating room".

The bandager, before authorising the person to enter the operating room, can assign the incoming person an authorisation level thus delimiting the places where the incoming person can intervene.

If the bandager decides to refuse access within the operating room 10 to the person, the display means 68 displays a message, for example a message on a red background such as "You are not allowed to enter the operating room".

In a particular embodiment, if the bandager refuses access to the person detected by the control means 52, the door can be temporarily locked to ensure that the person does not enter the operating room 10.

In one embodiment, the control device 26 comprises a device 64 for controlling the openings of the door 56, the control device 64 is for example disposed near the door 56. The control device 64 is connected to a door opening detection sensor 56.

In one embodiment, during a given period of time, such as the duration of a surgical operation, the control device 64 is intended to count the number of times that the door 56 is opened during a given period of time, comprising for example the duration of the operation.

In one embodiment, during a given period of time, such as the duration of a surgical operation, the control device 64 measures the duration during which the door 56 is open. Preferably, the control system 26 sums the times during which the door 56 of the operating room has been open.

In a particular embodiment, the door opening detection sensor 56, connected to the control device 64, can be an accelerometer placed on the door 56, a magnet or a distance sensor disposed nearby on one of the walls of the door frame 56.

The control system 26 comprises a third threshold value, connected to the control device 64. If the number of openings of the door 56, the opening time of the door 56 or the sum of the opening times of the door 56 reaches the third threshold value, a third warning signal is emitted. The third warning signal can be emitted by the alert device 42. When the third threshold value is reached, the display means 68, disposed outside the operating room 10 or at least visible from the outside of the operating room 10, displays a red background and an information message such as "Entry prohibited: Infectious Risk Danger".

In a particular embodiment, the control system 26 comprises a fourth threshold value, connected to the control device 64. The fourth threshold value is lower than the third threshold value. When the fourth threshold value is reached by the second control device 64, a fourth warning signal can be emitted by the alert device 42. When the fourth threshold value is reached, the display means 68, disposed outside the operating room 10 or at least visible from the outside of the operating room 10, displays an orange background and an information message such as "Access authorisation is required to enter the operating room".

In one embodiment the device 58 for counting people and the control device 64 are formed by a single counting device.

In one embodiment, when the control means 52 detects a person without an authorisation level, the display means 68 displays a message, for example a message on a red background such as "You are not allowed to enter the operating room".

In a particular embodiment, when the control means 52 detects a person without an authorisation level, the door 56 is temporarily locked to prevent the person from entering the surgical operating room 10 when an operation is taking place.

In one embodiment, the display means 68 systematically displays a message, for example a message on a red background such as "You are not authorised to enter the operating room". Only when the control means 52 detects a person to whom an authorisation level of "level 1", "level 2" or "level 3" has been allocated, the display means 68 can display a message, for example a green background and a message such as "You are authorised to enter the operating room".

In one embodiment, the door 56 is systematically locked and only when the control means 52 detects a "level 1", "level 2" or "level 3" person, the door 56 is unlocked.

In a particular embodiment, the monitoring system 26 comprises a sensor 66 measuring a density of particles in suspension in the surgical operating room 10. The particles in suspension may be microorganisms such as bacteria and/or viruses.

If the density of the particles in suspension in the surgical operating room 10 exceeds a threshold value, then an alert signal is triggered. Preferably, the alert signal is audible.

In a particular embodiment, the alert signal is emitted by the alert device 42.

In a particular embodiment, the control system 26 is a holistic system comprising:
at least one detection sensor 28,
at least one contact sensor 38,
the first counting device 58, connected to a detection sensor, such as a camera, to determine the number of people entering and leaving the surgical operating room 10,
the second control device 64 is connected to a sensor, such as a distance sensor, to determine whether the door 56 has been moved and consequently opened, and
at least one sensor 66 measuring a density of particles in suspension in the surgical operating room 10.

In a particular embodiment, the control system 26 can trigger an alert on the basis of a combination of the signals picked up by the following sensors:
detection sensor 28,
contact sensor 38,
detection sensor, such as a camera, to determine the number of people entering and leaving the surgical operating room 10,
a sensor, such as a distance sensor, to determine whether the door 56 has been moved and consequently opened, and
sensor 66 measuring a density of particles in suspension in the surgical operating room 10.

On the basis of the combination of signals perceived by these sensors, an aseptic rupture in the sterile volume 23 can be detected and signalled.

The invention has been described above using embodiments shown in figures, without limiting the general inventive concept.

Many other modifications and variations suggest themselves to the person skilled in the art, after reflection on the various embodiments illustrated in this application. These embodiments are given by way of example and are not intended to limit the scope of the invention, which is determined exclusively by the claims below.

In the claims, the word "comprising" does not exclude other elements or steps, and the use of the indefinite article "a" or "an" does not exclude a plurality. The mere fact that different features are listed in mutually dependent claims does not indicate that a combination of these features cannot be advantageously used. Finally, any reference used in the claims should not be interpreted as limiting the scope of the invention.

The invention claimed is:

1. A system for controlling the asepsis of a sterile volume (23) in the medical, industrial and food-processing fields, the system comprising:
at least one detection sensor configured to detect an intrusion in the sterile volume, and to output a signal relating to said detection,
a system for determining an aseptic fault of the sterile volume which is configured to receive at least one signal from the at least one detection sensor and to determine an aseptic fault of the sterile volume on the basis of the at least one received signal
a monitoring device configured to enable the transmission of an alert signal when an asepsis fault of the sterile volume is determined, and
a graphical interface configured to allow to define the sterile volume, in particular the boundaries of the sterile volumes, said graphical interface also being configured to allow the sterile volume to be redefined at any time.

2. The system for controlling the asepsis of a sterile volume according to claim 1, comprising at least one contact sensor connected to at least one non-sterile element and configured to allow the detection of any type of contact of an element located at least partly in the sterile volume with the at least one non-sterile element,
the system for determining an aseptic fault of the sterile volume being configured to receive at least one signal from the at least one contact sensor and to determine an aseptic fault of the sterile volume on the basis of the signals received from the at least one contact sensor.

3. The system for controlling the asepsis of a sterile volume according to claim 2, wherein the at least one contact sensor comprises a chemical sensor, and/or an electrostatic sensor, and/or a pressure sensor, and/or a proximity sensor, and/or an inertial sensor.

4. The system for controlling the asepsis of a sterile volume according to claim 1, comprising an alert device, the alert device being configured to emit an alert when an aseptic fault of the sterile volume is determined.

5. The system for controlling the asepsis of a sterile volume according to claim 4, wherein the alert device is configured to be deactivated manually.

6. The system for controlling the asepsis of a sterile volume according to claim 4, wherein the alert device is configured to be reactivated automatically, if no manual reactivation has taken place for a predetermined period of time.

7. The system for controlling the asepsis of a sterile volume according to claim 1, wherein the at least one detection sensor comprises a camera, and/or a photosensitive reflection sensor, and/or an infrared shower, and/or a distance sensor.

8. The system for controlling the asepsis of a sterile volume according to claim 1, wherein the at least one detection sensor is located outside the sterile volume.

9. The system for controlling the asepsis of a sterile volume according to claim 1, comprising an information storage device (48) configured to store, over time, the data of the at least one signal coming from the at least one detection sensor and/or of the at least one signal coming from the at least one contact sensor.

10. The system for controlling the asepsis of a sterile volume according to claim 9, comprising a display device, the display device being configured to display a representation of the stored data.

11. The system for controlling the asepsis of a sterile volume according to claim 1, comprising an authorisation level system configured to condition the access to a volume comprising the sterile volume to a person having a required authorisation level.

12. The system for controlling the asepsis of a sterile volume according to claim 1, comprising a device for counting people configured to count the number of people in a volume comprising the sterile volume.

13. The system for controlling the asepsis of a sterile volume according to claim 1, comprising a device for controlling openings of a door (56) allowing access to a volume comprising the sterile volume, the door opening control device is intended to control the number of times said door (56) is opened and/or the duration of opening of said door during a given period of time.

14. The system for controlling the asepsis of a sterile volume according to claim 1, comprising a particle density sensor measuring the density of particles in suspension in the sterile volume and/or a volume comprising the sterile volume.

15. A method for controlling the asepsis of a sterile volume by a control system according to claim 1, the method comprising:

detecting an intrusion in the sterile volume by said at least one detection sensor of the control system;

receiving a signal relating to an intrusion, output by the at least one detection sensor, by the determination system; and determining an aseptic fault of the sterile volume thanks to the determination system-f the control system on the basis of the at least one received signal, defining the sterile volume using a graphical interface.

16. The system for controlling the asepsis of a sterile volume according to claim 1, wherein the volume for which the access is conditioned in a room.

\* \* \* \* \*